United States Patent [19]

Nagano et al.

[11] Patent Number: 4,953,532
[45] Date of Patent: Sep. 4, 1990

[54] IGNITION TIMING CONTROL UNIT FOR INTERNAL COMBUSTION ENGINE

[75] Inventors: Masami Nagano; Takeshi Atago, both of Katsuta, Japan

[73] Assignee: Hitachi, Ltd., Tokyo, Japan

[21] Appl. No.: 336,783

[22] Filed: Apr. 13, 1989

[30] Foreign Application Priority Data

Apr. 15, 1988 [JP] Japan .................................. 63-91807

[51] Int. Cl.$^5$ ............................................. F02P 5/04
[52] U.S. Cl. ..................................... 123/419; 123/436
[58] Field of Search ............... 123/419, 422, 423, 329, 123/436

[56] References Cited

U.S. PATENT DOCUMENTS

| 4,575,800 | 3/1986 | Kittelson | 123/419 |
| 4,586,473 | 5/1986 | Nguyen | 123/419 |
| 4,596,217 | 6/1986 | Bonitz et al. | 123/419 |
| 4,799,469 | 1/1989 | Nagano et al. | 123/419 |
| 4,819,171 | 4/1989 | Morita | 123/419 |
| 4,838,227 | 6/1989 | Abromeit | 123/419 |
| 4,852,537 | 8/1989 | Nagano et al. | 123/419 |

Primary Examiner—Raymond A. Nelli
Attorney, Agent, or Firm—Antonelli, Terry, Stout & Kraus

[57] ABSTRACT

An ignition timing control unit for an internal combustion engine is constructed such that a predetermined amount of correction for the ignition timing of the engine is set beforehand in accordance with directions of change in the number of revolutions of the engine so that, during a predetermined period of time after the detection of an operation to accelerate the engine, the predetermined amount of correction for the ignition timing is added to standard ignition timing of the engine to suppress the change in the number of revolutions of the engine. The ignition timing control unit is provided with a revolution changing rate detector for detecting the rate of change in the number of revolutions of the engine, and the predetermined amount of correction for the ignition timing is controlled in accordance with the sign and magnitude of the rate of change in the number of revolutions of the engine, thereby preventing the change in the number of revolutions of the engine (or irregular awkward operation) when the load is changed suddenly.

8 Claims, 6 Drawing Sheets

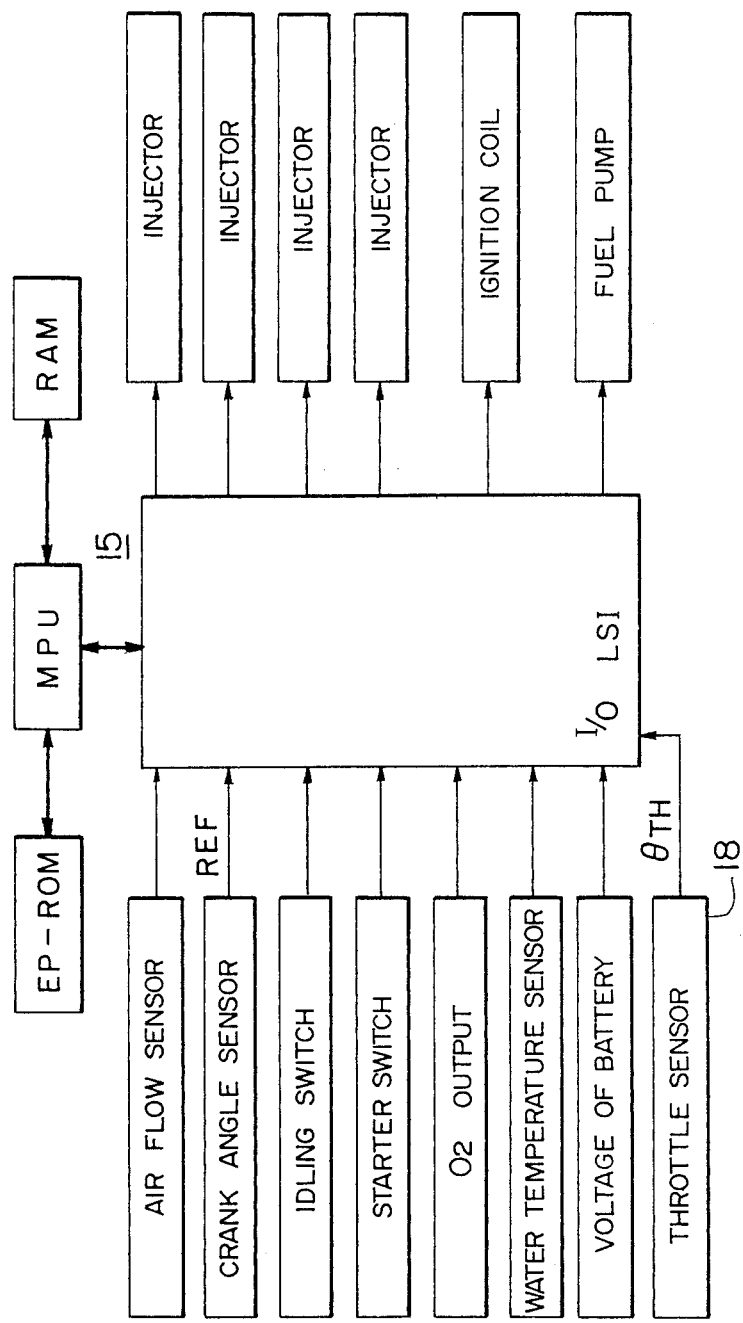

ΔADVu (NUMBER OF CORRECTING OPERATIONS)

| NUMBER OF CORRECTING OPERATIONS | 1 | 2 | 3 | 4 | 5 | 6 | 7 | 8 |
|---|---|---|---|---|---|---|---|---|
| AMOUNT OF CORRECTION | 0 | -1 | -2 | -1 | 0 | 0 | 0 | 0 |

ΔADVd (NUMBER OF CORRECTING OPERATIONS)

| NUMBER OF CORRECTING OPERATIONS | 1 | 2 | 3 | 4 | 5 | 6 | 7 | 8 |
|---|---|---|---|---|---|---|---|---|
| AMOUNT OF CORRECTION | 0 | 1 | 0 | 0 | 0 | 0 | 0 | 0 |

IGNITION TIMING CONTROL UNIT FOR INTERNAL COMBUSTION ENGINE

BACKGROUND OF THE INVENTION

The present invention relates to a control system for an internal combustion engine of electric ignition type, such as a gasoline engine, and more particularly, to an ignition timing control unit which is suitable for application to an automobile engine to prevent occurrence of irregular awkward running operation during acceleration.

In a vehicle, such as an automobile equipped with a gasoline engine, for example, when an accelerating operation is initiated by suddenly stepping on the accelerator pedal, there is produced in some cases a great change in running speed, that is, an acceleration surging, resulting in an awkward operation in which the speed fluctuates.

In order to suppress the occurrence of such awkward operation, there has hitherto been known a method in which engine torque is controlled by changing the ignition timing when an accelerating operation is detected, for instance, as disclosed in U.S. Pat. No. 4,799,469. Thus, according to this conventional method, a predetermined correction is constantly made on the standard ignition timing so as to suppress the change in the number of revolutions of the engine. This conventional method, however, gives no consideration to the fact that the change in the number of revolutions of the engine caused due to surging appears in an asymmetric form in some cases. This gives rise to a problem from the viewpoint of ensuring the satisfactory prevention of the irregular awkward operation at all times.

More specifically, in the above-described method, no consideration is give to a phenomenon in which, in some cases, the change in the number of revolutions of the engine appears in an asymmetric form with respect to the period and amplitude thereof in the increasing and decreasing directions. Accordingly, it is impossible with the above-described method to suppress the irregular operation satisfactorily when applied to an automobile or the like of the type that exhibits such asymmetric characteristic in the change in the number of revolutions of the engine.

SUMMARY OF THE INVENTION

An object of the present invention is to provide an ignition timing control unit for an internal combustion engine which is applied to a vehicle having an asymmetrical characteristic in terms of the change in the number of revolutions of the engine so as to constantly ensure satisfactory suppression of irregular awkward operation during acceleration.

According to the present invention, the above-described object can be achieved by detecting the rate of change in the number of revolutions of the engine and changing the amount of correction for the ignition timing in accordance with the sign and magnitude of the detected rate of change. In other words, since the amount of correction for the ignition timing changes in correspondence with the change in the number of revolutions of the engine, even if the change in the number of revolutions of the engine appears asymmetrically, an adequate correction for the ignition timing can be made at all times in response to that change, thereby ensuring satisfactory suppression of the irregular operation.

BRIEF DESCRIPTION OF THE DRAWINGS

FIG. 3 is a block diagram showing an example of a control unit for use in the embodiment of the invention;

DETAILED DESCRIPTION OF PREFERRED EMBODIMENTS

Figure 1:
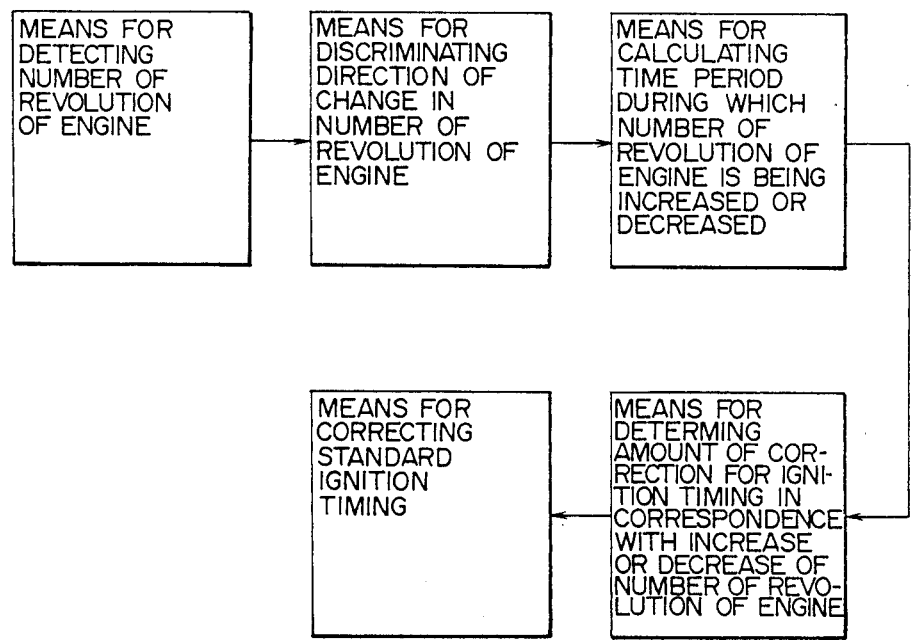
FIG. 1 is a block diagram for explanation of the controlling function of an ignition timing control unit for an internal combustion engine according to the present invention.

A detailed description will be given below of an ignition timing control unit for an internal combustion engine according to the present invention in connection with a preferred embodiment illustrated in the drawings.

Figure 2:
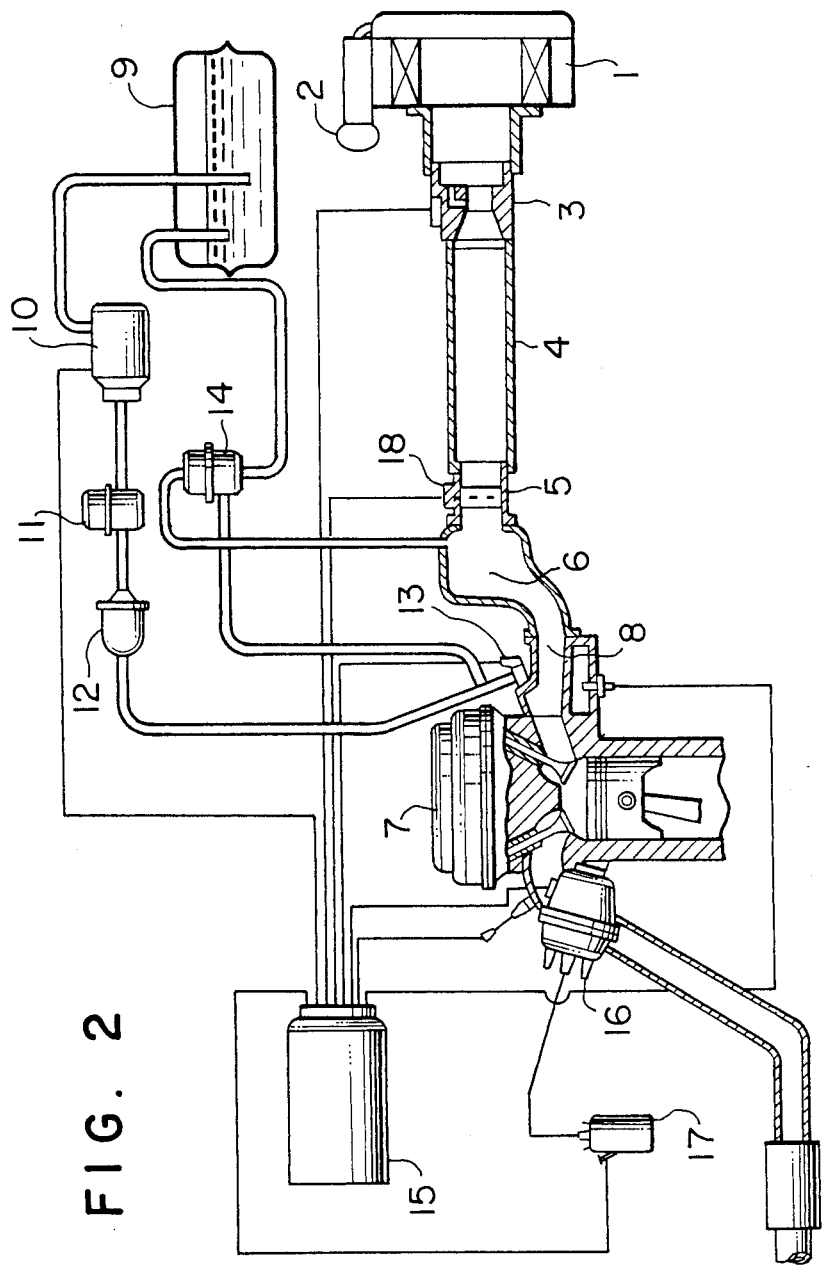
FIG. 2 is a block diagram of an engine system to which an embodiment of the present invention is applied.

FIG. 2 illustrates an example of an engine control system of the type to which the present invention is applied. Referring first to FIG. 2, air to be sucked into an engine is introduced from an inlet portion 2 of an air cleaner 1 and passes through a hot-wire air flow sensor 3 for detecting the quantity of suction air, a duct 4, and a throttle body 5 having a throttle valve for controlling the air flow rate, and then enters into a collector 6. In the collector 6, air is distributed to intake pipes 8 which communicate directly with the internal combustion engine 7 so as to be sucked into cylinders thereof.

On the other hand, fuel is fed from a fuel tank 9 and pressurized by means of a fuel pump 10 and then is supplied to a fuel system which includes a fuel damper 11, a fuel filter 12, injection valves 13 and a fuel pressure regulator 14. The fuel thus supplied to the fuel system is regulated to be at a constant pressure by means of the regulator 14 and then is injected into the intake pipes 8 through the injection valves (injectors) 13 provided on the intake pipes.

The air flow sensor 3 is adapted to output a signal representing the quantity of suction air. This output signal is inputted in a control unit 15.

Furthermore, the throttle body 5 is equipped with a throttle sensor 18 for detecting the degree of opening of the throttle valve. A signal from this sensor is also inputted in the control unit 15.

A reference numeral 16 denotes a distributor which has incorporated therein a crank angle sensor whose output is used to produce a standard signal for the injection timing and ignition timing and a signal representing the number of revolutions, these signals being produced in the control unit 15.

FIG. 3 shows the details of the control unit 15. As seen from FIG. 3, the control unit 15 is constituted by an arithmetic unit including an MPU (microprocessing unit), a ROM (read-only memory), an A/D (analog-digital) converter, and an input/output circuit. In this control unit, a predetermined arithmetic operation is performed on the basis of the output signal from the air flow sensor 3, the output from the distributor 16, etc. so as to produce an output signal indicative of the result of this operation. This output signal serves to actuate the injectors 13 so as to allow a required quantity of fuel to be injected into the respective intake pipes 8. Meanwhile, control of the ignition timing is effected by sending another signal from the control unit to a power transistor of an ignition coil 17.

With the arrangement described above, the manner of controlling operation of the ignition timing control unit for the internal combustion engine in accordance with the embodiment of the invention will be explained in the following.

Figure 4A:
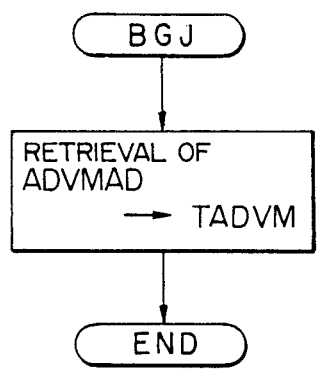
FIGS. 4A to 4C are flow charts showing the operation of the embodiment of the invention.
Figure 4B:
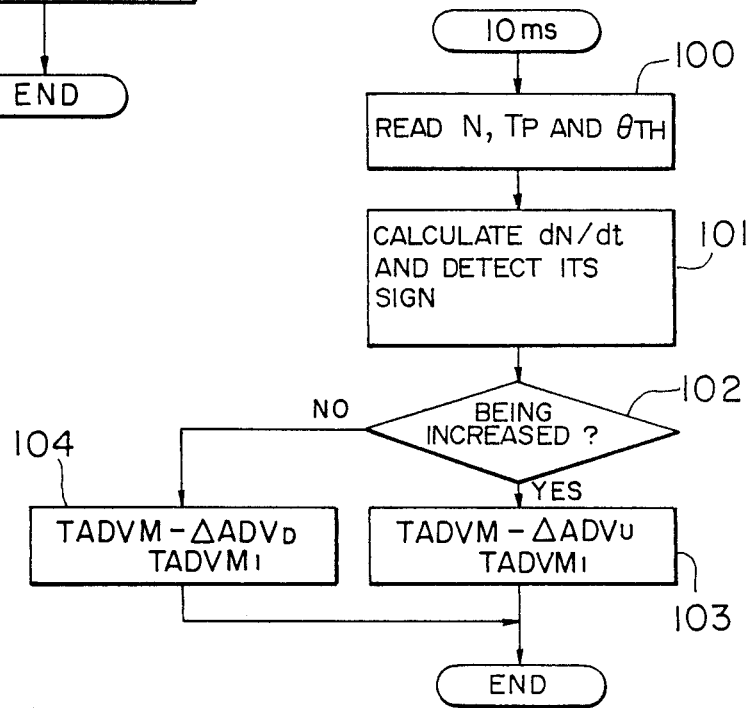
Figure 4C:
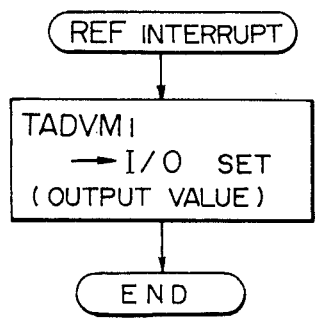

FIGS. 4A to 4C are flow charts showing the process for controlling the ignition timing according to an embodiment of the invention. The controlling process shown in FIGS. 4A to 4C is executed by the microcomputer including the MPU, the ROM and other like means in the control unit 15.

As understood from FIGS. 4A to 4C, in the present embodiment, the controlling process comprises three kinds of tasks that is, a [BGJ] task serving as a background job, a [10mS] task which is executed periodically every ten milliseconds, and an [REF interrupt] task which is executed each time a REF signal is produced. These tasks will be explained below in order.

First, the [BGJ] task is a background job in which retrieval of an ignition timing map ADVMAP is carried out on the basis of the number N of revolutions of the engine and the degree $\theta_{TH}$ of opening of the throttle, and then a reading of a standard ignition timing TADVM is carried out, as shown in FIG. 4A.

Secondly, in the [REF interrupt] task, a process for setting a corrected ignition timing TADVM$_1$ in a predetermined register of the I/O (input/output), shown in FIG. 3, is executed as shown in FIG. 4C. Accordingly, this corrected ignition timing TADVM$_1$ is an actual ignition timing of the engine.

It is noted that the data required for the above tasks, such as N, $\theta_{TH}$, TADVM$_1$ and the like, are given by the [10mS] task to be described below.

Finally, the [10mS] task shown in FIG. 4B will be explained. Explanation of this task will be made for every step.

Step 100: In this step, a reading of the number N of revolutions of the engine, a standard injection pulse width T$_P$, and the degree $\theta_{TH}$ of opening of the throttle is performed.

Step 101: In this step, the rate of change dN/dt in the number N of revolutions of the engine is calculated so that the direction of change is determined from the sign of the thus determined rate of change to detect the point of inflection thereof, thereby detecting whether the number N of revolutions is being increased or decreased.

Step 102: In this step, investigation is performed for judging whether or not the number N of revolutions is being increased.

Step 103: In this step, correction for the standard ignition timing TADVM is made when the number N of revolutions of the engine is being increased. The amount of correction is retrieved from a table $\Delta ADV_U$ shown in FIG. 5. Accordingly, the amount of correction is given in such a manner that it is 0°, 1°, 2°, 1°, and 0° at the first ignition, the second ignition, the third ignition, the fourth ignition and the subsequent ignition, respectively, after the number N of revolutions has changed its direction from the decreasing one to the increasing one. Incidentally, the amount of correction and the number of correcting operations mentioned above are set beforehand in correspondence with the pattern of the change in the number of revolutions peculiar to the engine.

Step 104: In this step, correction for the standard ignition timing TADVM is made when the number N of revolutions of the engine is being decreased. The amount of correction is retrieved from a table $\Delta ADV_D$ shown in FIG. 5. Accordingly, the amount of correction in this case is 0°, 1°, and 0° at the first ignition, the second ignition and the third and subsequent ignitions, respectively, after the number N of revolutions has changed its direction from an increasing one to a decreasing one. The amount of correction and the number of correcting operations in this case are also set to the values corresponding to the pattern of the change in the number of revolutions peculiar to the engine.

Next, description will be given of the operation of the described embodiment obtained as a result of execution of the process referred above.

As mentioned before, a surging is caused when a sudden accelerating operation is carried out by, for example, stepping on the accelerator pedal.

Figures 5, 6:
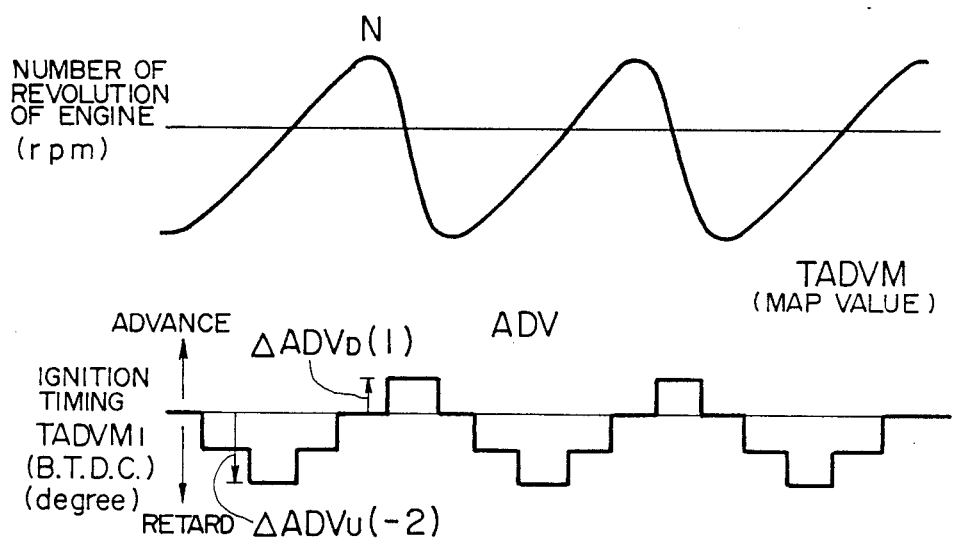
FIG. 5 is an explanatory diagram of an example of tables for ignition timing correction for use in the embodiment of the invention.
FIG. 6 is a diagram showing the operating characteristics obtained by the embodiment of the invention.

FIG. 6 shows the characteristic of the ignition timing ADV provided by the described embodiment at the time when the surging has occurred. As seen from the drawing, in this example of the surging, the change in the number of revolutions of the engine is such that the number of revolutions is increased gradually while it is decreased relatively steeply. Accordingly, since the correction for the standard ignition timing TADVM taken as a MAP value makes use of the tables shown in FIG. 5, retarding corrections are made at three ignition timing points, after the number of revolutions begin to increase, during the period of increase which continues for a relatively long time. On the other hand, an advancing correction is made at one ignition timing point during the period of decrease which is finished in a short time. The manner of correction described above can be expressed as shown in FIG. 1 by way of a functional block diagram.

Subsequently, effects of the present embodiment will be described with reference to FIGS. 7 and 8.

Figure 7:
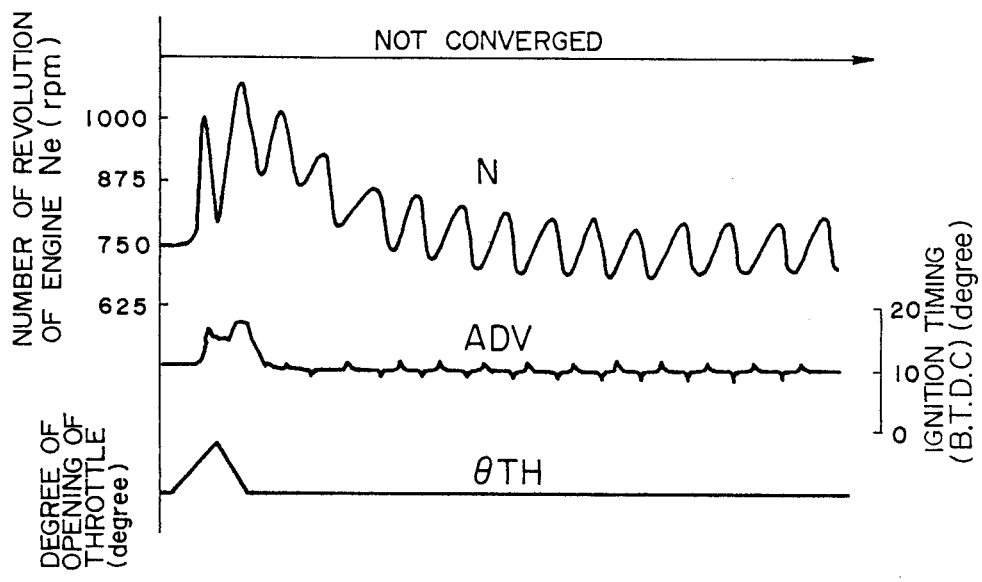
FIG. 7 is a characteristic view for explanation of effects of a conventional control unit.
Figure 8:
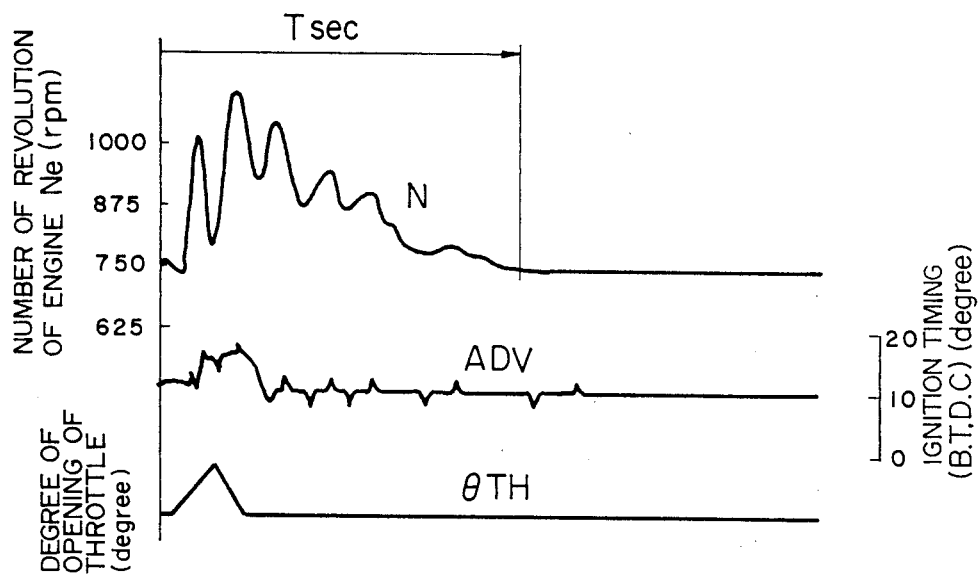
FIG. 8 is a characteristic view for explanation of effects of the embodiment of the invention.

These FIGS. 7 and 8 show what difference exists between the characteristics of the conventional method and the embodiment of the invention, respectively, after the surging has been made to occur intentionally by suddenly stepping on the accelerator pedal for a short time (an accelerating operation effected by once stepping instantaneously). FIG. 7 shows the results of a test conducted by making use of the conventional method, while FIG. 8 shows the results of a test conducted in accordance with the present invention.

It is understood from FIG. 7 that, according to the conventional method, although the magnitude of the change in the number N of revolutions of the engine can be made smaller in comparison with the case where no correction is made for the ignition timing, the change itself does not come to be prevented. This is because the change in the number N of revolutions of the engine appears in the same form as shown in FIG. 6.

On the other hand, it is understood from FIG. 8 that, by adopting the present invention, the change in the number of revolutions of the engine comes to disappear after a lapse of T sec from the point at which the accelerating operation is started, so that the surging can be prevented effectively. This is because also the correction for the ignition timing is given to show an asymmetric form in agreement with the change in the number N of revolutions of the engine which appears in an asymmetric form with respect to the increasing and decreasing portions thereof as shown in FIG. 6.

In consequence, according to the present embodiment, it is possible to constantly suppress the irregular awkward operation with certainty merely by setting the data for the tables shown in FIG. 5 in agreement with the characteristic of change in the number of revolutions of the engine.

Meanwhile, as preferred embodiments of the invention, there are two methods of setting the amount of correction and the number of correcting operations shown in FIG. 5. Namely, in the first method, upon confirming the pattern of the change in the number of revolutions of the engine, values which are capable of minimizing the magnitude of the change in the number of revolutions are set beforehand. In the second method, upon calculating the time periods during which the number of revolutions of the engine is being changed to increase and decrease, the magnitude of the change is checked at regular time intervals in relation to the thus calculated time periods so that, when it is judged that the magnitude of the change in the number of revolutions does not become small, the amount of correction and the number of correcting operations automatically undergo a feedback control to alter the set values.

The same effect of preventing the surging can be attained whichever the first or second method referred above is used when the invention is put into practice. According to the second method, however, since the amount of correction can be determined automatically although the necessary program capacity becomes large, it is possible to obtain a control unit of an extremely accurate type with use.

Incidentally, in the described embodiments of the invention, the correction for the ignition timing is made by increasing or decreasing both the amount of correction per one correcting operation and the number of correcting operations. However, modification can be made such that the correction is made by changing either of the above factors alone.

According to the present invention, the amounts of correction for the ignition timing, which correction is made for the control of torque, can be given as independent optimum values in correspondence with the cases that the number of revolutions of the engine is being changed to increased and decreased, respectively. Therefore, it becomes possible to make adequate correction for the ignition timing in agreement with the pattern of the change in the number of revolutions of the engine, irrespective of any difference in the types of the vehicles, such as various automobiles, to which the present invention is applied. Consequently, it is possible to prevent any irregular awkward operation with certainty and easily at all times without distinction as to the type of the vehicle involved.

What is claimed is:

1. In an ignition timing control apparatus for an internal combustion engine in which surging occurs during acceleration, and in which correction means is provided for controlling said surging by correcting a fundamental value of ignition timing by adding at least one correction ignition timing value to said fundamental value when said engine speed is changing in the decreasing direction and subtracting at least one correction value from said fundamental value when said engine speed is changing in the increasing direction, the improvement comprising:
means for controlling at least one of the number and magnitude of correction ignition timing values added to and subtracted from said fundamental value by said correction means so as to provide an asynchronous correction of engine speed during periods of increasing engine speed as compared to periods of decreasing engine speed when said surging results in an asynchronous pattern of engine speed change.

2. An ignition timing control apparatus according to claim 1, wherein said controlling means controls both the number and magnitude of correction ignition timing values added to and subtracted from said fundamental value.

3. An ignition timing control apparatus according to claim 2, wherein said controlling means operates to add a single correction ignition timing value to said fundamental value when engine speed is changing in the decreasing direction and to subtract three correction ignition timing values from said fundamental value when the engine speed is changing in the increasing direction.

4. An ignition timing control apparatus according to claim 1, wherein said controlling means includes means for calculating the rate of change of engine speed for a time period in which engine speed is decreasing and for a time period in which engine speed is increasing, and means for adjusting the number of correction ignition timing values to be added to and subtracted from said fundamental value on the basis of the calculated rate of change of engine speed by feedback control.

5. An ignition timing control apparatus for controlling surging during acceleration in an internal combustion engine, comprising:
means for determining a fundamental value of ignition timing based on detected operating parameters of the engine;
speed detecting means for detecting the number of revolutions of the engine per unit time;
means responsive to said speed detecting means for detecting surging and the direction of change in the number of revolutions of the engine per unit time during surging;
correction ignition timing means for producing correction ignition timing values for compensating changes in engine speed during surging, including a first number of correction ignition timing values for use during periods of decreasing engine speed and a second different number of correction ignition timing values for use during periods of increasing engine speed; and
means for correcting said fundamental value of ignition timing during surging by adding said first number of correction ignition timing values to said fundamental value when engine speed is decreasing and by subtracting said second number of correction ignition timing values from said fundamental value when engine speed is decreasing.

6. An ignition timing control apparatus according to claim 5, wherein said second number of correction ignition timing values is larger in number than said first number of correction ignition timing values.

7. An ignition timing control apparatus according to claim 5, wherein said correction ignition timing means comprises storage means for storing predetermined correction ignition timing values.

8. An ignition timing control apparatus according to claim 5, wherein said correction ignition timing means comprises means for calculating the rate of change of engine speed for a time period in which engine speed is decreasing and for a time period in which engine speed is increasing during surging and means for determining said first number of correction ignition timing values to be added to and said second number of correction ignition timing values to be subtracted from said fundamental value on the basis of the calculated rate of change of engine speed by feedback control.

* * * * *